(12) United States Patent
Lin et al.

(10) Patent No.: US 12,125,457 B2
(45) Date of Patent: Oct. 22, 2024

(54) DISPLAY PORT (DP) SINK DEVICE HAVING MAIN PHY CIRCUIT WITH PLURALITY OF DP CONNECTORS AND PLURALITY OF AUX PHY CIRCUITS COUPLED TO SUBSIDIARY LINK CIRCUIT

(71) Applicant: NOVATEK Microelectronics Corp., Hsin-Chu (TW)

(72) Inventors: Wen-Chi Lin, Yilan County (TW); Li-Wei Chen, Hsinchu (TW); Hsiang-Chih Chen, Taipei (TW); Pao-Yen Lin, Hsinchu (TW); Cheng-Wei Sung, Hsinchu (TW); Chung-Wen Hung, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 197 days.

(21) Appl. No.: 17/539,214

(22) Filed: Dec. 1, 2021

(65) Prior Publication Data

US 2022/0180838 A1 Jun. 9, 2022

Related U.S. Application Data

(60) Provisional application No. 63/121,226, filed on Dec. 3, 2020.

(51) Int. Cl.
*G09G 5/00* (2006.01)
*G09G 5/12* (2006.01)
*H04N 21/4363* (2011.01)

(52) U.S. Cl.
CPC ............. *G09G 5/005* (2013.01); *G09G 5/006* (2013.01); *G09G 5/12* (2013.01); *H04N 21/4363* (2013.01)

(58) Field of Classification Search
CPC .......... G09G 5/005; G09G 5/006; G09G 5/12; H04N 21/4363
See application file for complete search history.

(56) References Cited

U.S. PATENT DOCUMENTS

| 7,937,501 B2 * | 5/2011 | Goodart | G06F 3/14 725/144 |
| 8,122,160 B2 * | 2/2012 | Lee | G09G 5/006 710/316 |
| 9,015,357 B2 * | 4/2015 | Hunkins | G06F 13/385 710/52 |

(Continued)

FOREIGN PATENT DOCUMENTS

| CN | 103248847 A | 8/2013 |
| CN | 104737543 A | 6/2015 |

(Continued)

*Primary Examiner* — Tammara R Peyton
(74) *Attorney, Agent, or Firm* — Winston Hsu

(57) ABSTRACT

A signal processing circuit, complying with DisplayPort standard and operated in a display device which is as a DisplayPort sink device, includes a main physical circuit, which is configured to receive a first signal from one of a plurality of DisplayPort connectors of the display device connected to a first DisplayPort source device and a plurality of auxiliary physical circuits. Only a first auxiliary physical circuit of the plurality of auxiliary physical circuits is enabled to receive a second signal from the DisplayPort connector connected to the first DisplayPort source device.

14 Claims, 6 Drawing Sheets

(56) References Cited

U.S. PATENT DOCUMENTS

| | | | | |
|---|---|---|---|---|
| 9,858,232 | B2* | 1/2018 | Goodart | H04N 5/655 |
| 10,148,308 | B2* | 12/2018 | Lai | H04L 25/0298 |
| 10,607,564 | B2* | 3/2020 | Xie | G06F 13/4072 |
| 10,971,110 | B2* | 4/2021 | Nien | G09G 5/14 |
| 2004/0212610 | A1* | 10/2004 | Hamlin | G06F 3/1423 |
| | | | | 345/211 |
| 2008/0084359 | A1* | 4/2008 | Giannuzzi | G09G 5/006 |
| | | | | 345/1.1 |
| 2008/0205519 | A1 | 8/2008 | Goodart | |
| 2009/0153574 | A1* | 6/2009 | Chou | G09G 5/003 |
| | | | | 345/531 |
| 2013/0080665 | A1 | 3/2013 | Park | |
| 2014/0115192 | A1 | 4/2014 | Hunkins | |
| 2015/0212785 | A1* | 7/2015 | Chiba | G09G 5/12 |
| | | | | 345/520 |
| 2019/0324934 | A1 | 10/2019 | Chan | |

FOREIGN PATENT DOCUMENTS

| | | |
|---|---|---|
| CN | 104903879 A | 9/2015 |
| CN | 105978750 A | 9/2016 |
| TW | I382394 | 1/2013 |
| TW | I594181 B | 8/2017 |
| TW | 201742440 A | 12/2017 |

* cited by examiner

DISPLAY PORT (DP) SINK DEVICE HAVING MAIN PHY CIRCUIT WITH PLURALITY OF DP CONNECTORS AND PLURALITY OF AUX PHY CIRCUITS COUPLED TO SUBSIDIARY LINK CIRCUIT

CROSS REFERENCE TO RELATED APPLICATIONS

This application claims the benefit of U.S. provisional application No. 63/121,226 filed on Dec. 3, 2020, which is incorporated herein by reference.

BACKGROUND OF THE INVENTION

1. Field of the Invention

The present invention relates to a signal processing circuit and a link initialization method thereof, and more particularly, to a signal processing circuit and a link initialization method thereof to improve operation efficiency, reduce costs, or make error free communication possible.

2. Description of the Prior Art

DisplayPort is a standard of a digital display interface developed as the next generation personal computer display interface, and is now available on a wide range of products, including tablets, notebooks, desktop computers, computer monitors, and TVs with 4K (or up) resolution. Generally, a DisplayPort receiver of a DisplayPort sink device such as a computer monitor with two DisplayPort receiving ports (or DisplayPort RX ports) includes two sets of receiver circuits (namely, two main physical circuits, two main link circuits, two auxiliary physical circuits, and two auxiliary link circuits) so as to operate in display modes such as picture-in-picture (PIP) or picture-by-picture (PBP).

However, regarding to a DisplayPort sink device which is not necessary to simultaneously display images of different DisplayPort source devices, having two sets of receiver circuits costs more and becomes less competitive.

On the other hand, regarding to a DisplayPort sink device having two DisplayPort receiving ports but only one set of receiver circuit, merely one DisplayPort source device can connect to the DisplayPort sink device through one of the two DisplayPort receiving ports. Another DisplayPort source device plugging into the other one of the two DisplayPort receiving ports cannot identify the DisplayPort sink device.

Consequently, there is still room for improvement when it comes to the configuration/operation of a DisplayPort sink device.

SUMMARY OF THE INVENTION

In order to solve aforementioned problem(s), the present invention provides a signal processing circuit and a link initialization method thereof, which improve operation efficiency, reduce costs, or make error free communication possible.

The present invention discloses a signal processing circuit, complying with DisplayPort (DP) standard and operated in a display device which is as a DP sink device, comprising a main physical circuit, configured to receive a first signal from one of a plurality of DisplayPort connectors of the display device which is connected to a first DisplayPort source device; and a plurality of auxiliary physical circuits, wherein only a first auxiliary physical circuit of the plurality of auxiliary physical circuits is enabled to receive a second signal from the DisplayPort connector connected to the first DisplayPort source device.

The present invention further discloses a link initialization method, for a signal processing circuit of a display device, comprising providing a training completion result to a first DisplayPort source device when the first DisplayPort source device is connected to the display device while a second DisplayPort source device is still being connected to the display device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
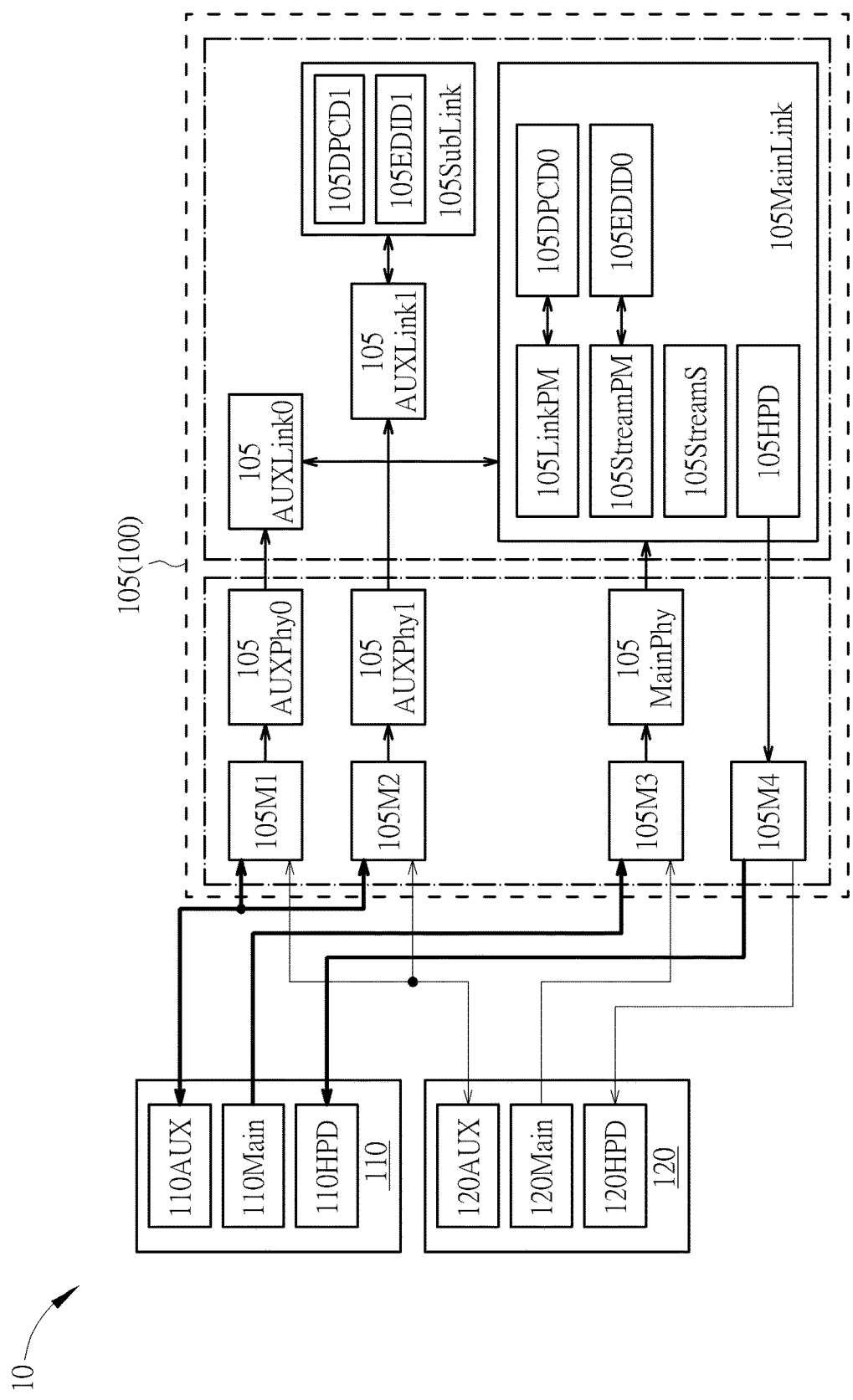
FIG. 1 is a schematic diagram of an electrical system according to an embodiment of the present invention.

FIG. 1 is a schematic diagram of an electrical system 10 according to an embodiment of the present invention. The electrical system 10 includes a display device 100 as a DisplayPort sink device and DisplayPort source devices 110, 120. The display device 100 includes a signal processing circuit 105 and DisplayPort connectors (not shown). The signal processing circuit 105 includes one main physical circuit 105MainPhy, two auxiliary physical circuits 105AUXPhy0, 105AUXPhy1, one main link circuit 105MainLink, two auxiliary link circuits 105AUXLink0, 105AUXLink1, one subsidiary link circuit 105SubLink, and multiplexers 105M1 to 105M4. For example, the DisplayPort source devices 110, 120 may be different computers and the display device 100 may be a computer monitor.

In short, the signal processing circuit 105 performs a link training process using the main link circuit 105MainLink, such that the DisplayPort source device 110, which plugs into the display device 100 first, is able to identify/discover the display device 100 and stream data transmission can be successfully performed between the DisplayPort source device 110 and the display device 100. On the other hand, the signal processing circuit 105 provides a training completion result to the DisplayPort source device 120 without the help of the main link circuit 105MainLink, such that the DisplayPort source device 120, which plugs into the display device 100 having been connected to the DisplayPort source device 110, is able to identify/discover the display device 100 as well even though there is no data transmission between the DisplayPort source device 120 and the display device 100.

The DisplayPort source device 110/120 able to identify/discover the display device 100 means that the DisplayPort source device 110/120 is able to read Extended Display Identification Data (EDID) of the display device 100 and the link training process between the signal processing circuit 105 and the DisplayPort source device 110/120 can be completed. After reading EDID of the display device 100, the DisplayPort source device is able to know the capabilities (such as the resolution and the data receiving speed) of the display device 100. The link training process is configured for the DisplayPort source device 110/120 and the display device 100 to communicate physical layer capabilities (for instance, to configure the link between the DisplayPort source device 110/120 and the display device 100 with optimal transmission settings for voltage swing, pre-emphasis, lane speed, and lane count for the coming data transfer between the DisplayPort source device 110/120 and the display device 100). If a DisplayPort source device cannot identify/discover the display device 100, subsequent data transmission will not be performed.

Figure 2:
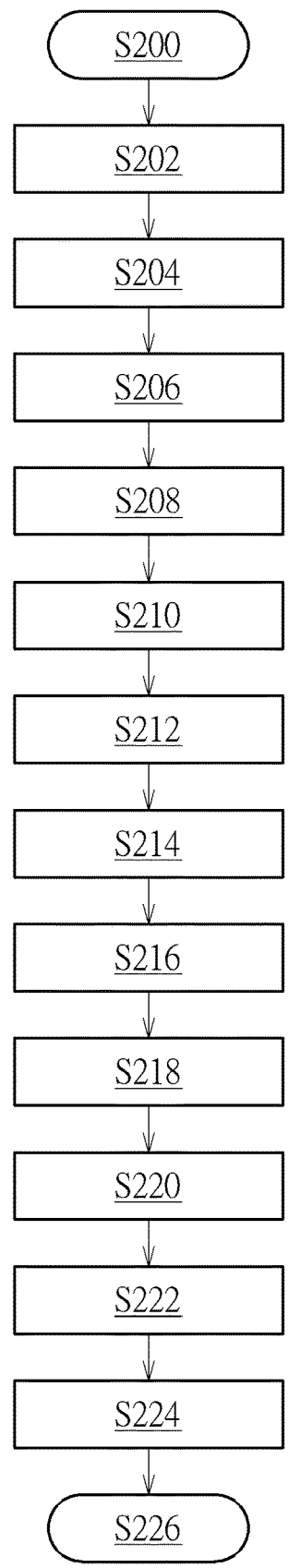
FIG. 2 is a flowchart of a link initialization method according to an embodiment of the present invention.

FIG. 2 is a flowchart of a link initialization method 20 according to an embodiment of the present invention. The steps of the link initialization method 20 are as follows:

Step S200: Start.

Step S202: The DisplayPort source device 110 plugs into a (first) DisplayPort connector of the display device 100.

Step S204: The DisplayPort source device 110 may read EDID stored in an EDID register 105EDID0 of the signal processing circuit 105 of the display device 100.

Step S206: A link training process is initiated and may be controlled by the DisplayPort source device 110, and the signal processing circuit 105 may respond to commands from the DisplayPort source device 110.

Step S208: During the link training process, the DisplayPort source device 110 may transmit training pattern(s), write drive settings, and/or send request(s) to read a DisplayPort configuration data (DPCD) register 105DPCD0 of the signal processing circuit 105.

Step S210: The DisplayPort source device 110 may read a first training completion result, which is provided by the DPCD register 105DPCD0 of the signal processing circuit 105.

Step S212: The DisplayPort source device 110 may indicate the end of the link training process after reading the first training completion result.

Step S214: The DisplayPort source device 110 may start transmission of stream data.

Step S216: The DisplayPort source device 120 plugs into a (second) DisplayPort connector of the display device 100.

Step S218: The DisplayPort source device 120 may read EDID stored in an EDID register 105EDID1 of the signal processing circuit 105 of the display device 100.

Step 220: The DisplayPort source device 110 may try to initiate another link training process.

Step S222: The DisplayPort source device 110 may read a second training completion result, which is provided by a DPCD register 105DPCD1 of the signal processing circuit 105.

Step S224: The DisplayPort source device 110 may indicate the end of the link training process after reading the second training completion result.

Step S226: End.

Specifically, if the DisplayPort source device 110 is the one plugged into a DisplayPort connector of the display device 100 (called a first DisplayPort connector in the following) first, the main physical circuit 105MainPhy is configured to receive signal(s) from the first DisplayPort connector connected to the DisplayPort source device 110. Those signal(s) transmitted from the first DisplayPort connector to the main physical circuit 105MainPhy is called the first signal(s) hereinafter. The multiplexer 105M3, electrically connected to all the DisplayPort connectors and the main physical circuit 105MainPhy, may switch to and thus receive the first signal(s) from the first DisplayPort connector connected to the DisplayPort source device 110 to transmit the first signal(s) to the main physical circuit 105MainPhy.

Corresponding to the operation of the multiplexer 105M3, the multiplexer 105M1, electrically connected to all the DisplayPort connectors and the auxiliary physical circuit 105AUXPhy0, may switch to and thus receive signal(s) from the first DisplayPort connector connected to the DisplayPort source device 110 to transmit the signal(s) to the auxiliary physical circuit 105AUXPhy0. Those signal(s) transmitted from the first DisplayPort connector to the auxiliary physical circuit 105AUXPhy0 is called the second signal(s) hereinafter. In other words, only the auxiliary physical circuit 105AUXPhy0 is enabled to receive the second signal(s) from the first DisplayPort connector connected to the DisplayPort source device 110 and the auxiliary physical circuit 105AUXPhy1 is not enabled.

The auxiliary physical circuit 105AUXPhy0 receiving the second signal(s) may output processed second signal(s) (for instance, digital signal(s)) to the auxiliary link circuits 105AUXLink0. The auxiliary link circuits 105AUXLink0 receiving the processed second signal(s) may output further-processed second signal(s) (for instance, command(s)) to the main link circuit 105MainLink. Besides, the main physical circuit 105MainPhy receiving the first signal(s) may output processed first signal(s) to the main link circuit 105MainLink.

The main link circuit 105MainLink may include the EDID register 105EDID0, the DPCD register 105DPCD0, a link policy maker circuit 105LinkPM, a stream policy maker circuit 105StreamPM, a stream sink circuit 105StreamS, and a hot plug detect circuit 105HPD. Information about the maximum bit rate (namely, data receiving speed) and/or the lane count of the display device 100 may be stored in the DPCD register 105DPCD0. DPCD is a data format describing the link and display stream compression capabilities; EDID is a data format describing the capabilities of the display device 100.

After the DisplayPort source device 110 plugs into the display device 100, the DisplayPort source device 110 may read the EDID register 105EDID0 of the display device 100 through the auxiliary physical circuit 105AUXPhy0, the auxiliary link circuit 105AUXLink0, and the link policy maker circuit 105LinkPM to find out the EDID stored in the EDID register 105EDID0 in Step S204.

After the DisplayPort source device 110 plugs into the display device 100, a link training process may be actually performed (for example, by taking all the steps of the DisplayPort standard step by step) in Step S206. A link training process may determine/coordinate physical link parameters (number of lanes, lane speed, voltage swing, pre-emphasis, equalization) used for transmission of video and audio data. A link training process may involve a Clock and Data Recovery (CDR) training and/or an equalization training.

For example, in the CDR training of Step S208, the DisplayPort source device 110 may send a training pattern to the signal processing circuit 105. The DisplayPort source device 110 may send a request (for example, a request for reading the LANEx_CR_DONE bit(s)) to the display device 100, where x may be 0, 1, 2, or 3 but is not limited thereto. The DisplayPort source device 110 may read (the value of) the LANEx_CR_DONE bit(s) of the DPCD register 105DPCD0. If the CDR training can be completed (for example, clocks get synchronized), the display device 100 may set the LANEx_CR_DONE bit(s) to 1. Otherwise, the LANEx_CR_DONE bit(s) may remain unset (namely, the same value of 0). In other words, a first DPCD parameter (for instance, the LANEx_CR_DONE bit(s)) is set in the DPCD register 105DPCD0 according to result(s) of a link training process. The DisplayPort source device 110 may send training pattern(s) and request(s) for iteration until the DisplayPort source device 110 finds the value of the LANEx_CR_DONE bit(s) equal to 1 or until the DisplayPort source device 110 ends the link training process without establishing the link between the display device 100 and the DisplayPort source device 110.

Following the CDR training comes the equalization training. In the equalization training of Step S208, the DisplayPort source device 110 may send a training pattern to the signal processing circuit 105. The DisplayPort source device 110 may send a request (for example, a request for reading the LANEx_CHANNEL_EQ_DONE bit(s), the LANEx_SYMBOL_LOCKED bit(s), and/or the INTERLANE_ALIGN_DONE bit(s)) to the display device 100, where x may be 0, 1, 2, or 3 based on that the number of transmission lanes of the DisplayPort interface is 4, but is not limited thereto. The DisplayPort source device 110 may read (the value of) the LANEx_CHANNEL_EQ_DONE bit(s), the LANEx_SYMBOL_LOCKED bit(s), and/or the INTERLANE_ALIGN_DONE bit(s) of the DPCD register 105DPCD0. If the equalizer training can be completed (for example, the training pattern is recognized), the display device 100 may set the LANEx_CHANNEL_EQ_DONE bit(s), the LANEx_SYMBOL_LOCKED bit(s), and/or the INTERLANE_ALIGN_DONE bit(s) to 1 respectively. Otherwise, the LANEx_CHANNEL_EQ_DONE bit(s), the LANEx_SYMBOL_LOCKED bit(s), and/or the INTERLANE_ALIGN_DONE bit(s) may remain unset (namely, the same value of 0). In other words, the first DPCD parameter (for instance, any of the LANEx_CR_DONE bit(s), the LANEx_CHANNEL_EQ_DONE bit(s), the LANEx_SYMBOL_LOCKED bit(s), or the INTERLANE_ALIGN_DONE bit(s)) is set in the DPCD register 105DPCD0 according to result(s) of a link training process. The DisplayPort source device 110 may send training pattern(s) and request(s) for iteration until the DisplayPort source device 110 finds the value of the LANEx_CHANNEL_EQ_DONE bit(s), the LANEx_SYMBOL_LOCKED bit(s), and/or the INTERLANE_ALIGN_DONE bit(s) equal to 1 (or until the DisplayPort source device 110 ends the link training process without establishing the link between the display device 100 and the DisplayPort source device 110).

The display device 100 may indicate the success by setting the LANEx_CHANNEL_EQ_DONE bit(s), the LANEx_SYMBOL_LOCKED bit(s), and/or the INTERLANE_ALIGN_DONE bit(s) to 1 respectively, which may serve as the first training completion result. In other words, the DisplayPort source device 110 may read information related to the result(s) of the link training process (such as the first training completion result) from the DPCD register 105DPCD0 in Step S210.

After the DisplayPort source device 110 has read the EDID of the display device 100 and the link training process has been completed, the DisplayPort source device 110, which plugs into the display device 100 first, is able to identify/discover the display device 100. Then, the DisplayPort source device 110 is able to perform data transmission and image display through the main physical circuit 105MainPhy and/or the main link circuit 105MainLink in Step S214.

Corresponding to the operation of the multiplexer 105M3, the multiplexer 105M2, electrically connected to all the DisplayPort connectors and the auxiliary physical circuit 105AUXPhy1, may be able to switch to another DisplayPort connector (referred to as the second DisplayPort connector) of the display device 100. After the DisplayPort source device 120 plugs into the display device 100 having been connected to the DisplayPort source device 110, the multiplexer 105M2 transfers signal(s) from the second DisplayPort connector connected to the DisplayPort source device 120 to the auxiliary physical circuit 105AUXPhy1. Those signal(s) transmitted from the second DisplayPort connector to auxiliary physical circuit 105AUXPhy1 is called the third signal(s) hereinafter. The auxiliary physical circuit 105AUXPhy1 receiving the third signal(s) may output processed third signal(s) (for instance, digital signal(s)) to the auxiliary link circuits 105AUXLink1. The auxiliary link circuits 105AUXLink1 receiving the processed third signal(s) may output further-processed third signal(s) (for instance, command(s)) to the subsidiary link circuit 105SubLink.

The subsidiary link circuit 105SubLink, which may be hardware, may include the EDID register 105EDID1 and the DPCD register 105DPCD1. After the DisplayPort source device 120 plugs into the display device 100, which has been connected to the DisplayPort source device 110 and may be displaying image(s) transmitted from the DisplayPort source device 110, the DisplayPort source device 120 may read the EDID register 105EDID1 of the display device 100 via the auxiliary physical circuit 105AUXPhy1 and the auxiliary link circuit 105AUXLink1 to find out the EDID stored in the EDID register 105EDID1 in Step S218.

In fact, the subsidiary link circuit 105SubLink facilitates the identification of the display device 100. By reading the subsidiary link circuit 105SubLink, the DisplayPort source device 120 is able to find out the EDID of the display device 100 even without the connection between the main link circuit 105MainLink and the DisplayPort source device 120.

The EDID register 105EDID1 (or 105EDID0) may be hardware such as a random access memory (RAM). The EDID registers 105EDID0 and 105EDID1 may not be the same RAM physically and may be separate from each other. The EDID register 105EDID0 may store information about the capabilities for one DisplayPort connector (for instance, which specification(s) is/are supported), while the EDID register 105EDID1 may store information about the capabilities for another DisplayPort connector. The data stored in the EDID register 105EDID0 (or 105EDID1) may be pre-determined (for instance, by developers) and may be the same as or different from that of the EDID register 105EDID1 (or 105EDID0). That is, the display device 100 may have different EDID each corresponding to one of the DisplayPort connectors.

After the DisplayPort source device 120 plugs into the display device 100, which has been connected to the DisplayPort source device 110 and may be displaying image(s) transmitted from the DisplayPort source device 110, the DisplayPort source device 120 may intend to perform a link training process of the DisplayPort standard in Step S220. Although it is impossible for the DisplayPort source device 120 to actually perform the link training process complying with the DisplayPort standard with the display device 100, the DisplayPort source device 120 is able to read information related to result(s) corresponding to a link training process (such as the second training completion result) in Step S222 and thus determines/deems that the display device 100 is identified/discovered. In other words, after the DisplayPort source device 120 reads the EDID of the display device 100 and the second training completion result provided by the DPCD register 105DPCD1, the DisplayPort source device 120, which plugs into the display device 100 having been connected to the DisplayPort source device 110, is able to identify/discover the display device 100 as the DisplayPort sink device.

The DisplayPort source device 120 is able to read the DPCD register 105DPCD1 of the subsidiary link circuit 105SubLink via the auxiliary physical circuit 105AUXPhy1 and the auxiliary link circuit 105AUXLink1. The value of the LANEx_CR_DONE bit(s), the LANEx_CHANNEL_EQ_DONE bit(s), the LANEx_SYMBOL_LOCKED bit(s), and/or the INTERLANE_ALIGN_DONE bit(s) of the DPCD register 105DPCD1 may be set to 1. As long as the DisplayPort source device 120 finds the value of the LANEx_CR_DONE bit(s), the LANEx_CHANNEL_EQ_DONE bit(s), the LANEx_SYMBOL_LOCKED bit(s), and the INTERLANE_ALIGN_DONE bit(s) equal to 1, which may serve as the second training completion result, in Step S222, the DisplayPort source device 120 may determine/deem that the desired link training process is performed successfully. In other words, the second training completion result is provided (namely, by setting the value of the LANEx_CR_DONE bit(s), the LANEx_CHANNEL_EQ_DONE bit(s), the LANEx_SYMBOL_LOCKED bit(s), and the INTERLANE_ALIGN_DONE bit(s) to 1 respectively) without the recognition of a training pattern from the DisplayPort source device 120 or without the reception of any training pattern from the DisplayPort source device 120.

Note that, since the multiplexer 105M3 electrically connected to the main physical circuit 105MainPhy may switch to the first DisplayPort connector connected to the DisplayPort source device 110 instead of the second DisplayPort connector connected to the DisplayPort source device 120, signal(s) from the second DisplayPort connector connected to the DisplayPort source device 120 is/are not transmitted to the main physical circuit 105MainPhy. The DisplayPort source device 120, which plugs into the display device 100 having been connected to the DisplayPort source device 110, is able to identify/discover the display device 100; however, the DisplayPort source device 120 is unable to perform data transmission and image display during the data transmission from the DisplayPort source device 110.

After both the DisplayPort source devices 110 and 120 are connected to and can identify/discover the display device 100, the display device 100 may be disconnected from the DisplayPort source device 110 and switch to the DisplayPort source device 120. For example, a user of the display device 100 may unplug the DisplayPort source device 110 so as to display image(s) delivered from the DisplayPort source device 120. Alternatively, a user of the display device 100 may switch the display device 100 to the DisplayPort source device 110 through a user menu of the display device 100 so as to display image(s) delivered from the DisplayPort source device 120.

The electrical system 10 of the present invention may cut costs. As shown in FIG. 1, the physical layer (of a DisplayPort receiver) of the signal processing circuit 105 includes two auxiliary physical circuits 105AUXPhy0, 105AUXPhy1 but only one main physical circuit 105MainPhy. The number of the auxiliary physical circuits 105AUXPhy0, 105AUXPhy1 of the signal processing circuit 105 may equal that of the DisplayPort connectors of the display device 100. However, the number of the main physical circuit 105MainPhy of the signal processing circuit 105 is less than that of the auxiliary physical circuits 105AUXPhy0, 105AUXPhy1, and thereby reduces costs.

For cost reduction, the link layer (of the DisplayPort receiver) of the signal processing circuit 105 may include two auxiliary link circuits 105AUXLink0, 105AUXLink1 but only one main link circuit 105MainLink. The signal processing circuit 105 may further include the subsidiary link circuit 105SubLink, but the structure of the subsidiary link circuit 105SubLink is less complicate than that of the main link circuit 105MainLink to reduce expenses. For example, the subsidiary link circuit 105SubLink lacks a link policy maker circuit, a stream policy maker circuit, a stream sink circuit, and/or a hot plug detect circuit.

In a word, the auxiliary physical circuits 105AUXPhy0, 105AUXPhy1 (or the auxiliary link circuits 105AUXLink0, 105AUXLink1) of the display device 100 correspond to the DisplayPort connectors of the display device 100 respectively. Only one of the DisplayPort connectors (or only one of the auxiliary physical/link circuits) corresponds to the main physical circuit 105MainPhy and/or the main link circuit 105MainLink; the other of the DisplayPort connectors (or the other of the auxiliary physical/link circuits) does not correspond to the main physical circuit 105MainPhy or the main link circuit 105MainLink.

Figure 3:
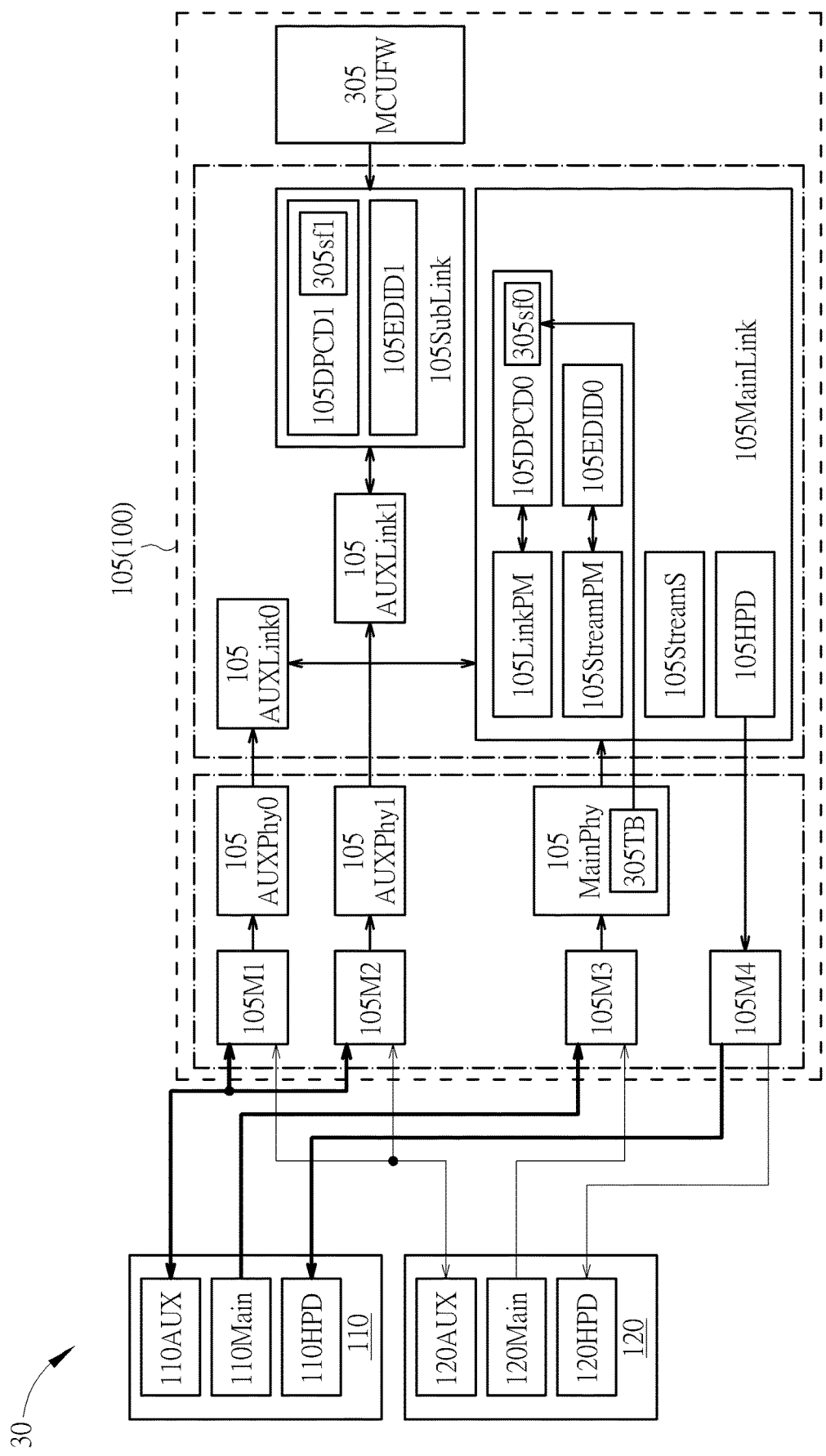
FIGS. 3-6 are schematic diagrams of electrical systems according to embodiments of the present invention.

FIG. 3 is a schematic diagram of an electrical system 30 according to an embodiment of the present invention.

The main physical circuit 105MainPhy of the electrical system 30 may include a link training circuit 305TB configured for performing a link training process. For example, the link training circuit 305TB may control a CDR circuit (of the DisplayPort receiver) of the signal processing circuit 105 of the electrical system 30 to perform a CDR training or control equalizer(s) (of the DisplayPort receiver) of the signal processing circuit 105 to perform an equalization training. A control program for a CDR training or an equalization training may be implemented by a digital circuit such as the link training circuit 305TB.

As shown in FIG. 3, the DPCD register 105DPCD0 of the main link circuit 105MainLink of the electrical system 30 may include a link status field $305sf0$. The first DPCD parameter (for instance, any of the LANEx_CR_DONE bit(s), the LANEx_CHANNEL_EQ_DONE bit(s), the LANEx_SYMBOL_LOCKED bit(s), or the INTERLANE_ALIGN_DONE bit(s)) may be in the link status field $305sf0$ (for instance, in address range of 00202 to 0020C of the DisplayPort standard) of the DPCD register 105DPCD0. The signal processing circuit 105 of the electrical system 30 may set the LANEx_CR_DONE bit(s) in the link status field $305sf0$ of the DPCD register 105DPCD0 until the optimization of drive setting of the DisplayPort source device 110 in the CDR training is completed. The values of the LANEx_CR_DONE bit(s), the LANEx_CHANNEL_EQ_DONE bit(s), the LANEx_SYMBOL_LOCKED bit(s), and/or the INTERLANE_ALIGN_DONE bit(s) all set to 1 mean that a specific bit rate, a lane count, a voltage swing, and/or pre-emphasis level(s) is/are determined.

As shown in FIG. 3, the DPCD register 105DPCD1 of the subsidiary link circuit 105SubLink of the electrical system 30 may include a link status field $305sf1$. The second DPCD parameter (for instance, any of the LANEx_CR_DONE bit(s), the LANEx_CHANNEL_EQ_DONE bit(s), the LANEx_SYMBOL_LOCKED bit(s), or the INTERLANE_ALIGN_DONE bit(s)) may be in the link status field $305sf1$ (for instance, in address range of 00202 to 0020C) of the DPCD register 105DPCD1. The values of the LANEx_CR_DONE bit(s), the LANEx_CHANNEL_EQ_DONE bit(s), the LANEx_SYMBOL_LOCKED bit(s), and/or the INTERLANE_ALIGN_DONE bit(s) all set to 1 mean that a specific bit rate, a lane count, a voltage swing, and/or pre-emphasis level(s) is/are determined.

As shown in FIG. 3, the signal processing circuit 105 of the electrical system 30 may include a circuit 305MCUFW. The DPCD register 105DPCD1 may be controlled by firmware held in the circuit 305MCUFW. The circuit 305MCUFW may be a microprocessor.

In an embodiment, the value of the LANEx_CR_DONE bit(s), the LANEx_CHANNEL_EQ_DONE bit(s), the LANEx_SYMBOL_LOCKED bit(s), and/or the INTERLANE_ALIGN_DONE bit(s) of the DPCD register 105DPCD1 (each of which may serve as a second DPCD parameter) may be preset to 1 respectively to indicate the success of a CDR training or an equalization training. In an embodiment, the second DPCD parameter stored in the DPCD register 105DPCD1 may be of fixed value(s). The fixed value(s) is/are the value(s) configured to make the DisplayPort source device 120 deem/believe that the desired link training process can be completed (without going through a full link training process). For example, the DPCD register 105DPCD1 may provide information about the feasibility of 5.4 Gbps. If the DisplayPort source device 120 set lane speed to 5.4 Gbps, the DisplayPort source device 120 may read a training completion result from the DPCD register 105DPCD1. In another embodiment, the second DPCD parameter stored in the DPCD register 105DPCD1 may be of configurable value(s), which make the DisplayPort source device 120 deem/believe that the desired link training process can be completed (without going through a full link training process). The second DPCD parameter may be modifiable by the circuit 305MCUFW. The firmware held in the circuit 305MCUFW may control the DPCD register 105DPCD1 to set the second DPCD parameter or to make the DisplayPort source device 120 deem/believe that the desired link training process can be completed (without going through a full link training process). In another embodiment, some of the second DPCD parameters stored in the DPCD register 105DPCD1 may be of fixed value(s), some may be of configurable value(s), and the others may follow the DisplayPort standard.

With the subsidiary link circuit 105SubLink (of the DisplayPort receiver) of the signal processing circuit 105, the display device 100 may make/enable the DisplayPort source device 120 to read a training completion result without the help of, for example, a link policy maker circuit, which is configured for keeping the link between the display device 100 and a DisplayPort source device synchronized, if the DisplayPort source device 120 attempts to perform a link training process. As a result, the DisplayPort source device 120 may be able to identify/discover the display device 100 having been connected to the DisplayPort source device 110. The DisplayPort source device 120 may deem the display device 100 including the signal processing circuit 105 a legal/authenticated DisplayPort sink device and can acquire information of the display device 100.

Figure 4:
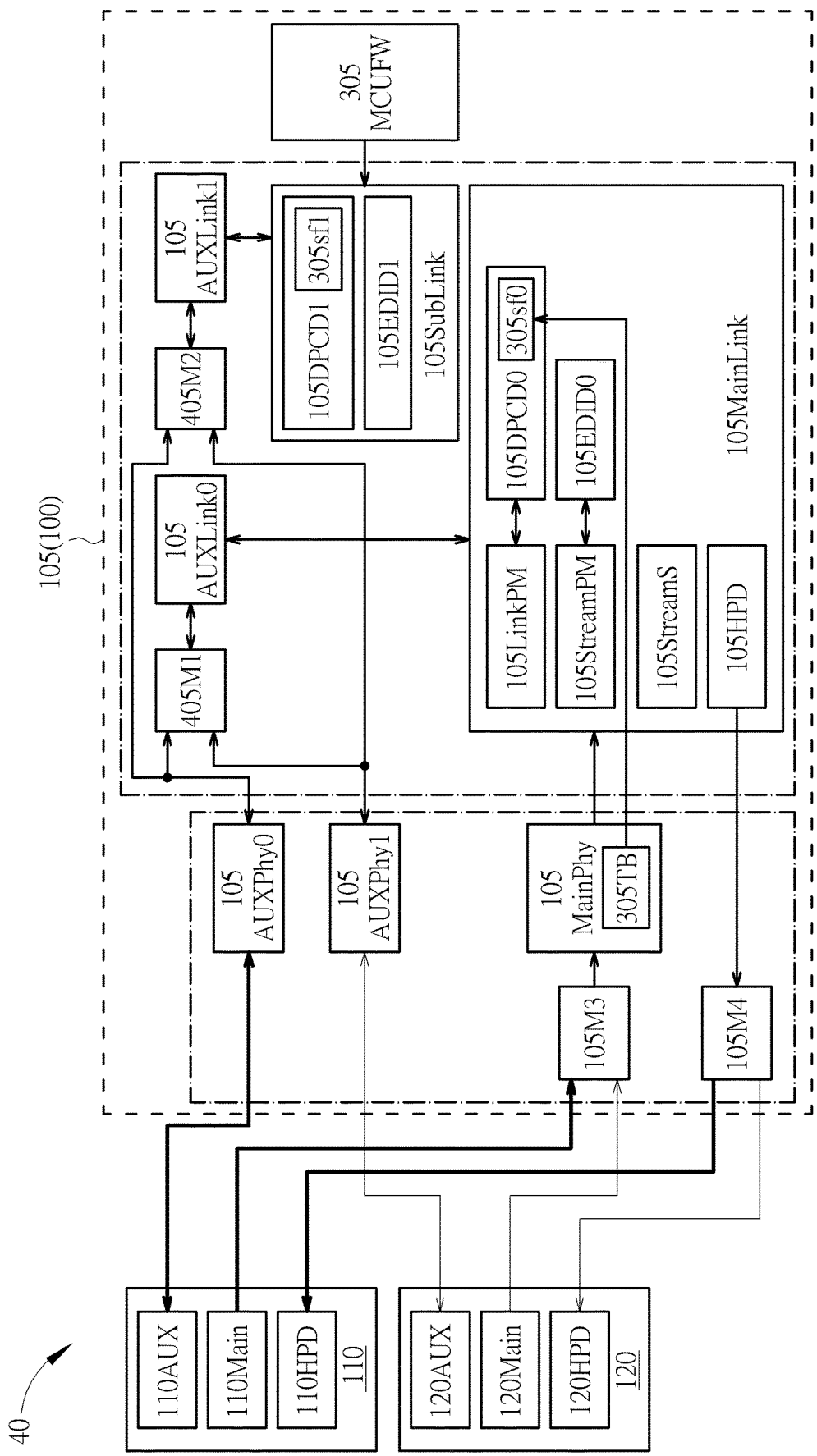

FIG. 4 is a schematic diagram of an electrical system 40 according to an embodiment of the present invention. The signal processing circuit 105 of the electrical system 40 may include multiplexers 405M1 and 405M2 instead of the multiplexers 105M1 and 105M2.

If the DisplayPort source device 110 is the one plugged into a DisplayPort connector of the display device 100 (called a first DisplayPort connector in the following) first, the multiplexer 105M3, electrically connected to all the DisplayPort connectors and the main physical circuit 105MainPhy, may switch to and thus receive the (first) signal(s) from the first DisplayPort connector connected to the DisplayPort source device 110 to transmit the signal(s) to the main physical circuit 105MainPhy. Those signal(s) transmitted from the first DisplayPort connector to the main physical circuit 105MainPhy is called the first signal(s) hereinafter.

Corresponding to the operation of the multiplexer 105M3, the multiplexer 405M1, electrically connected to the auxiliary physical circuits 105AUXPhy0, 105AUXPhy1 and the auxiliary link circuits 105AUXLink0, may switch to the auxiliary physical circuits 105AUXPhy0 connected to the first DisplayPort connector, such that the auxiliary physical circuit 105AUXPhy0 receiving the second signal(s) from the first DisplayPort connector may output processed second signal(s) to the auxiliary link circuits 105AUXLink0. The auxiliary link circuits 105AUXLink0 receiving the processed second signal(s) may output further-processed second) signal(s) to the main link circuit 105MainLink.

Corresponding to the operation of the multiplexer 105M3, the multiplexer 405M2, electrically connected to the auxiliary physical circuits 105AUXPhy0, 105AUXPhy1 and the auxiliary link circuits 105AUXLink1, may be able to switch to the auxiliary physical circuits 105AUXPhy1 connected to the second DisplayPort connector. After the DisplayPort source device 120 plugs into the display device 100 having been connected to the DisplayPort source device 110, the auxiliary physical circuit 105AUXPhy1 receiving the third signal(s) from the second DisplayPort connector may output processed third signal(s) to the auxiliary link circuits 105AUXLink1. The auxiliary link circuits 105AUXLink1 receiving the processed third signal(s) may output further-processed third signal(s) to the subsidiary link circuit 105SubLink.

Figure 5:
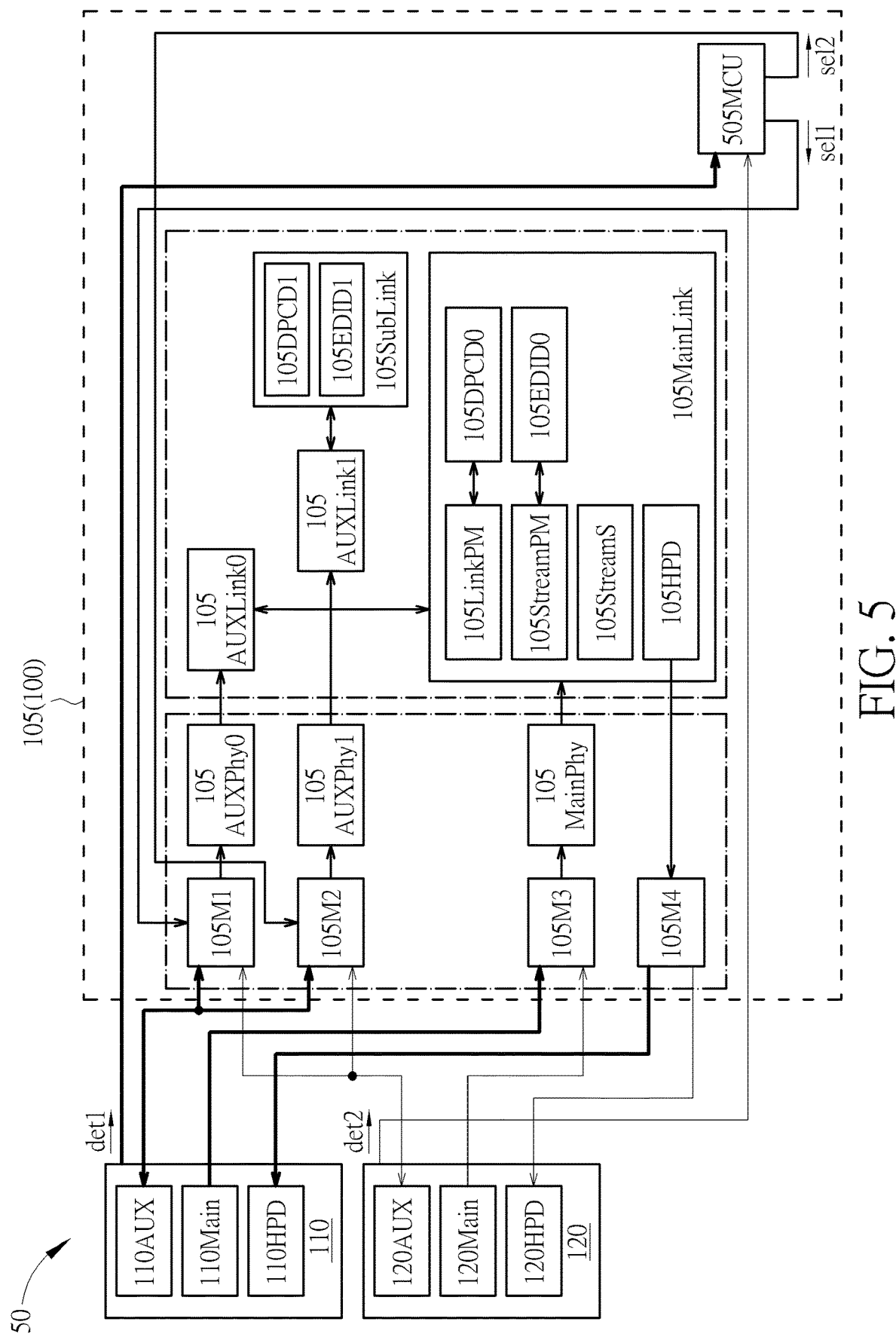

FIG. 5 is a schematic diagram of an electrical system 50 according to an embodiment of the present invention. The signal processing circuit 105 of the electrical system 50 may include a circuit 505MCU. The circuit 505MCU may be a microprocessor. The circuit 505MCU may be configured to generate control signals to control any of the multiplexers 105M1 to 105M4 of the electrical system 50.

In FIG. 1 and FIGS. 3 to 5, each of the DisplayPort connectors of the display device 100 may serve as a DisplayPort receiving port and include a terminal corresponding to the main physical circuit 105MainPhy, a terminal corresponding to the auxiliary physical circuit 105AUXPhy0 or 105AUXPhy1, and a terminal corresponding to the hot plug detect circuit 105HPD. Moreover, each of the DisplayPort connectors of the display device 100 may include a detection terminal (or a socket) for detecting the presence of a DisplayPort source device.

The detection terminals of the DisplayPort connectors may be connected to the circuit 505MCU. When a DisplayPort source device plugs into a DisplayPort connector of the display device 100, the voltage of the detection terminal of the DisplayPort connector (serving as a detection signal) may change. The circuit 505MCU may determine whether there is a DisplayPort source device plugging into the display device 100 according to the change in the voltage of the detection terminal. The circuit 505MCU may generate a control signal to control at least one of the multiplexers of the display device 100, such as 105M1 and 105M2, according to the voltage of the detection terminal.

For example, when the DisplayPort source device 110 plugs into the first DisplayPort connector of the display device 100 first but the second DisplayPort connector has not been connected to any DisplayPort source device, the voltage of a detection signal det1 may change (for instance, from a voltage of logic value 0 to another voltage of logic value 1) at the detection terminal of the first DisplayPort connector. The voltage of a detection signal det2 may be unchanged (for instance, remain logic value 0) at the detection terminal of the second DisplayPort connector. According to the detection signals det1, det2, the circuit 505MCU may output a control signal sel1 (for instance, equal to logic value 0) to switch the multiplexer 105M1 to connect the auxiliary physical circuit 105AUXPhy0 to the first DisplayPort connector connected to the DisplayPort source device 110.

When the DisplayPort source device 110 plugs into the second DisplayPort connector of the display device 100 having been connected to the DisplayPort source device 110, the voltage of the detection signal det2 may change (for instance, from the voltage of logic value 0 to the voltage of logic value 1) at the detection terminal of the second DisplayPort connector. The voltage of the detection signal det1 may be unchanged (for instance, remain logic value 1) at the detection terminal of the first DisplayPort connector. According to the detection signals det1, det2, the circuit 505MCU may output a control signal sel2 (for instance, equal to logic value 1) to switch the multiplexer 105M2 to connect the auxiliary physical circuit 105AUXPhy1 to the second DisplayPort connector connected to the DisplayPort source device 120. The multiplexer 105M1 however may not switch again.

In other words, the DisplayPort source devices 110 and 120 connected to the display device 100 one after the other may establish connections with the auxiliary link circuits 105AUXLink0, 105AUXLink1 through the auxiliary physical circuits 105AUXPhy0, 105AUXPhy1 respectively.

Figure 6:
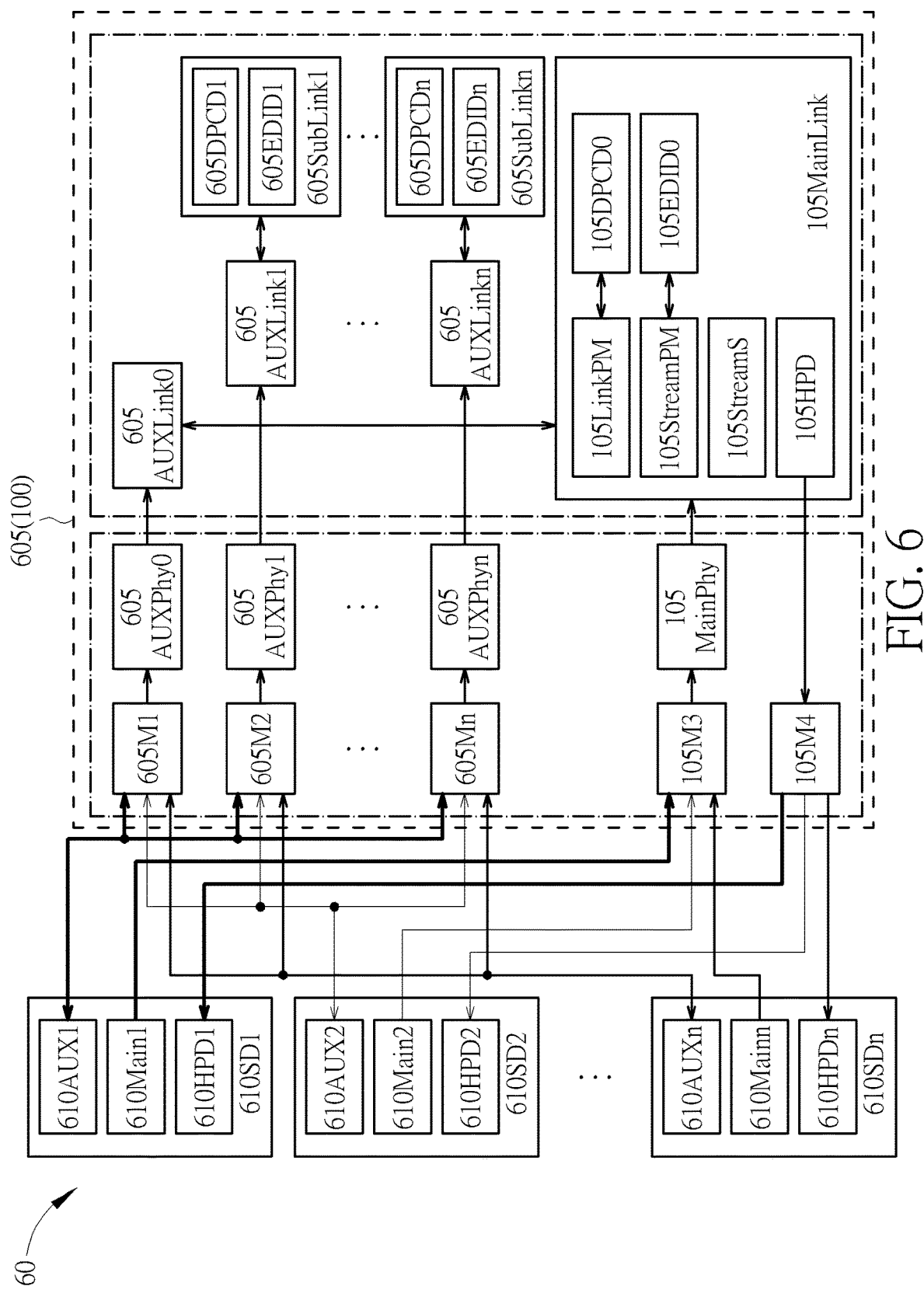

FIG. 6 is a schematic diagram of an electrical system 60 according to an embodiment of the present invention. The electrical system 60 may include a display device 100 and more than two DisplayPort source devices 610SD1 to 610SDn, where n is an integer. Correspondingly, a signal processing circuit 605 of the display device 100 of the electrical system 60 may include more than two auxiliary physical circuits 605AUXPhy0 to 605AUXPhyn, more than two auxiliary link circuits 605AUXLink0 to 605AUXLinkn, more than one subsidiary link circuit 605SubLink1 to 605SubLinkn, and more multiplexers 605M1 to 605Mn. The structure/function of the DisplayPort source devices 610SD1 to 610SDn is basically similar to that of the DisplayPort source device 110/120. By the same token, the structure/function of components of the signal processing circuit 605 is basically similar to that of the signal processing circuit 105.

For example, in the CDR training of Step S208, a main circuit 610Main1 of the DisplayPort source device 610SD1 may send a clock recovery (CR) pattern of CR-pattern-at-Voltage-Swing-0 (namely, at the minimum voltage swing) to the display device 100. A auxiliary circuit 610AUX1 of the DisplayPort source device 610SD1 may send a request for reading the LANEx_CR_DONE bit(s) via the auxiliary physical circuit 605AUXPhy0, the auxiliary link circuit 605AUXLink0, the link policy maker circuit 105LinkPM and finally to the DPCD register 105DPCD0. The DisplayPort source device 610SD1 may read the LANEx_CR_DONE bit(s) of the DPCD register 105DPCD0.

If the value of the LANEx_CR_DONE bit(s) in the DPCD register 105DPCD0 is equal to 0, the main circuit 610Main1 of the DisplayPort source device 610SD1 may send a CR pattern of CR-pattern-at-Voltage-Swing-1 (namely, at a higher voltage swing) to the display device 100. Moreover, the auxiliary circuit 610AUX1 of the DisplayPort source device 610SD1 may send a request for reading the LANEx_CR_DONE bit(s). The DisplayPort source device 610SD1 may read the LANEx_CR_DONE bit(s) of the DPCD register 105DPCD0 again. If the value of LANEx_CR_DONE is still equal to 0, the main circuit 610Main1 of the DisplayPort source device 610SD1 may send a CR pattern of CR-pattern-at-Voltage-Swing-2 to the display device 100. The auxiliary circuit 610AUX1 of the DisplayPort source device 610SD1 may send a request for reading the LANEx_ CR_DONE bit(s). The DisplayPort source device 610SD1 may read the LANEx_CR_DONE bit(s) of the DPCD register 105DPCD0 again.

After the DisplayPort source device 610SD2, . . . , or 610SDn plugs into the display device 100, which has been connected to the DisplayPort source device 610SD1 and may be displaying image(s) transmitted from the DisplayPort source device 610SD1, the DisplayPort source device 610SD2, . . . , or 610SDn is able to read information related to result(s) corresponding to the success of a link training process (such as the second training completion result) from the DPCD register 605DPCD1, . . . , or 605DPCDn of the subsidiary link circuit 605SubLink1, . . . , or 605SubLinkn in Step S222 and thus determines/deems that the display device 100 is identified/discovered. The value of the LANEx_CR_DONE bit(s), the LANEx_CHANNEL_EQ_DONE bit(s), the LANEx_SYMBOL_LOCKED bit(s), and/or the INTERLANE_ALIGN_DONE bit(s) of the DPCD register 605DPCD1, . . . , or 605DPCDn may be set to 1.

In the present invention, a signal processing circuit may be implemented in a scalar integrated circuit (IC) of a computer monitor (as a display device), but is not limited thereto. A signal processing circuit may be connected to the DisplayPort connectors of the display device through traces on a system circuit board. e.

To sum up, a display device which is not necessary to simultaneously display images of different DisplayPort source devices costs less because the display device requires less main physical circuit and less main link circuit. A signal processing circuit in the display device according to the embodiments of the present invention prevents the display device from being deemed unidentifiable to a DisplayPort source device which plugs into the display device after an earlier-connected DisplayPort source device still connecting to the display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing circuit, complying with DisplayPort (DP) standard and operated in a display device which is as a DP sink device, comprising:
 a main physical circuit, configured to receive a first signal from a first DisplayPort connector which is connected to a first DisplayPort source device, wherein a plurality of DisplayPort connectors of the display device comprises the first DisplayPort connector and a second DisplayPort connector;
 a plurality of auxiliary physical circuits, wherein only a first auxiliary physical circuit of the plurality of auxiliary physical circuits is enabled to receive a second signal from the first DisplayPort connector connected to the first DisplayPort source device, and a physical layer comprises the main physical circuit and the plurality of auxiliary physical circuits;

a main link circuit, coupled to the main physical circuit;
a first auxiliary link circuit, coupled to the main link circuit and configured to receive a processed second signal which is originated from the second signal from the first DisplayPort connector connected to the first Display Port source device;
a second auxiliary link circuit, coupled to the second DisplayPort connector which is not connected to the first DisplayPort source device; and
a subsidiary link circuit, coupled to the second auxiliary link circuit and coupled to the second DisplayPort connector through the second auxiliary link circuit.

2. The signal processing circuit of claim 1, wherein the main physical circuit comprises a link training circuit configured for performing a link training process.

3. The signal processing circuit of claim 1, wherein each of the plurality of auxiliary physical circuits are coupled to the plurality of DisplayPort connectors and the signal processing circuit further comprises:
a first multiplexer, electrically connected to the plurality of DisplayPort connectors of the display device and the first auxiliary physical circuit, and configured to output the second signal from the first DisplayPort connector connected to the first DisplayPort source device; and
a second multiplexer, electrically connected to the plurality of DisplayPort connectors of the display device and another auxiliary physical circuit different from the first auxiliary physical circuit; and
a third multiplexer, electrically connected to the plurality of DisplayPort connectors of the display device and the main physical circuit, and configured to output the first signal from the first DisplayPort connector connected to the first DisplayPort source device.

4. The signal processing circuit of claim 1, wherein the plurality of auxiliary physical circuits are respectively coupled to the plurality of DisplayPort connectors and the signal processing circuit further comprises:
a first multiplexer, electrically connected to the plurality of auxiliary physical circuits and the first auxiliary link circuit; and
a second multiplexer, electrically connected to the plurality of auxiliary physical circuits and the second auxiliary link circuit; and
a third multiplexer, electrically connected to the plurality of DisplayPort connectors of the display device and the main physical circuit, and configured to output the first signal from the first DisplayPort connector connected to the first DisplayPort source device.

5. The signal processing circuit of claim 1, wherein the main link circuit comprises a first extended display identification data (EDID) register and a first DisplayPort configuration data (DPCD) register, a first DPCD parameter is set into the first DPCD register according to results of a link training process, the subsidiary link circuit comprises a second EDID register and a second DPCD register, and a second DPCD parameter in the second DPCD register is fixed or modifiable by a controller.

6. The signal processing circuit of claim 5, wherein the signal processing circuit provides a training completion result stored in the second DPCD register to a second DisplayPort source device which is connected to the display device later than the first DisplayPort source device while the first DisplayPort source device is still being connected to the display device.

7. The signal processing circuit of claim 6, wherein the signal processing circuit generates the training completion result without recognition of a link training pattern from the second DisplayPort source device or without reception of any link training pattern from the second DisplayPort source device.

8. A link initialization method, for a signal processing circuit complying with DisplayPort (DP) standard and operated in a display device which is as a DP sink device, comprising:
providing a training completion result to a first DisplayPort source device when the first DisplayPort source device is connected to the display device while a second DisplayPort source device is still being connected to the display device, wherein a physical layer of the signal processing circuit comprises a main physical circuit and a plurality of auxiliary physical circuits, wherein the signal processing circuit further comprises:
a main link circuit, coupled to the main physical circuit; and
a first auxiliary link circuit, coupled to the main link circuit and configured to receive a processed first signal which is originated from a first signal from a first DisplayPort connector, which is connected to the second DisplayPort source device, wherein a plurality of DisplayPort connectors of the display device comprises the first DisplayPort connector and a second DisplayPort connector;
a second auxiliary link circuit, coupled to the second DisplayPort connector which is not connected to the second DisplayPort source device; and
a subsidiary link circuit, coupled to the second auxiliary link circuit and coupled to the second DisplayPort connector through the second auxiliary link circuit.

9. The link initialization method of claim 8, wherein the training completion result is generated without recognition of a link training pattern received from the first source device or without reception of any link training pattern from the first source device.

10. The link initialization method of claim 8, wherein the signal processing circuit comprises:
the main physical circuit, configured to receive a second signal from the first DisplayPort connector which is connected to the second DisplayPort source device; and
the plurality of auxiliary physical circuits, wherein only a first auxiliary physical circuit of the plurality of auxiliary physical circuits is enabled to receive the first signal from the first DisplayPort connector connected to the second DisplayPort source device.

11. The link initialization method of claim 8, wherein the main physical circuit comprises a link training circuit configured for performing a link training process.

12. The link initialization method of claim 10, wherein each of the plurality of auxiliary physical circuits are coupled to the plurality of DisplayPort connectors, and the signal processing circuit further comprises:
a first multiplexer, electrically connected to the plurality of DisplayPort connectors of the display device and the first auxiliary physical circuit, and configured to output the first signal from the first DisplayPort connector connected to the second DisplayPort source device; and
a second multiplexer, electrically connected to the plurality of DisplayPort connectors of the display device and another auxiliary physical circuit different from the first auxiliary physical circuit; and
a third multiplexer, electrically connected to the plurality of DisplayPort connectors of the display device and the main physical circuit, and configured to output the second signal from the first DisplayPort connector connected to the second DisplayPort source device.

13. The link initialization method of claim 8, wherein the plurality of auxiliary physical circuits are respectively coupled to the plurality of DisplayPort connectors and the signal processing circuit further comprises:
- a first multiplexer, electrically connected to the plurality of auxiliary physical circuits and the first auxiliary link circuit;
- a second multiplexer, electrically connected to the plurality of auxiliary physical circuits and the second auxiliary link circuit; and
- a third multiplexer, electrically connected to the plurality of DisplayPort connectors of the display device and the main physical circuit, and configured to output the second signal from the first DisplayPort connector connected to the second DisplayPort source device.

14. The link initialization method of claim 8, wherein the main link circuit comprises a first extended display identification data (EDID) register and a first DisplayPort configuration data (DPCD) register, and a first DPCD parameter is set into the first DPCD register according to results of a link training process, the subsidiary link circuit comprises a second EDID register and a second DPCD register, and a second DPCD parameter in the second DPCD register is fixed or modifiable by a controller.

* * * * *